(12) United States Patent
Arai et al.

(10) Patent No.: US 12,038,386 B1
(45) Date of Patent: Jul. 16, 2024

(54) IMAGE CAPTURING UNIT AND INSPECTION SYSTEM

(71) Applicant: Robit Inc., Tokyo (JP)

(72) Inventors: Masahiro Arai, Tokyo (JP); Kaoru Kawakita, Tokyo (JP); Ryuichi Hirano, Tokyo (JP)

(73) Assignee: ROBIT INC., Tokyo (JP)

( * ) Notice: Subject to any disclaimer, the term of this patent is extended or adjusted under 35 U.S.C. 154(b) by 0 days.

(21) Appl. No.: 18/542,036

(22) Filed: Dec. 15, 2023

Related U.S. Application Data

(63) Continuation of application No. PCT/JP2023/019347, filed on May 24, 2023.

(51) Int. Cl.
*G01N 21/88* (2006.01)
*G01N 21/84* (2006.01)

(52) U.S. Cl.
CPC ..... *G01N 21/8806* (2013.01); *G01N 21/8851* (2013.01); *G01N 2021/845* (2013.01); *G01N 2021/8841* (2013.01)

(58) Field of Classification Search
CPC .... G01N 21/85; G01N 21/89; G01N 21/8806; G01N 2021/8841
See application file for complete search history.

(56) References Cited

U.S. PATENT DOCUMENTS

| 10,035,176 | B2 | 7/2018 | Ito et al. |
| 2014/0061103 | A1 | 3/2014 | Ito et al. |

FOREIGN PATENT DOCUMENTS

| CN | 1703071 A | 11/2005 |
| CN | 106053342 A | 10/2016 |
| JP | H09108640 A | 4/1997 |
| JP | H10-174938 A | 6/1998 |
| JP | 2001-179187 A | 7/2001 |
| JP | 2008302314 A | 12/2008 |
| JP | 4915129 B2 | 4/2012 |
| JP | 2012-250193 A | 12/2012 |
| JP | 2013-101082 A | 5/2013 |
| JP | 2013164338 A | 8/2013 |
| JP | 2018-202305 A | 12/2018 |
| KR | 101384541 B1 | 4/2014 |

OTHER PUBLICATIONS

International Search Report for PCT/JP2023/019347 mailed Jul. 25, 2023.
Decision to Grant for Japanese Patent Application No. 2023-550697 mailed Sep. 15, 2023 (partially translated).
Chinese Office Action for Chinese Patent Application No. 202380012209.7 mailed Apr. 30, 2024 (partially translated).

*Primary Examiner* — Tarifur R Chowdhury
*Assistant Examiner* — Amanda Merlino
(74) *Attorney, Agent, or Firm* — Thomas | Horstemeyer, LLP

(57) ABSTRACT

An image capturing unit in an inspection system for performing an inspection target appearance inspection, the image capturing unit comprising, an image capture unit, an illumination unit arranged in a periphery of the image capture unit, and a protective unit covering the image capture unit and the illumination unit, wherein the protective unit includes a plate-like member configured by a first planar portion and a second planar portion being connected through a bent portion bent in a dog leg shape, and the image capture unit is located on a back side of the first planar portion.

13 Claims, 10 Drawing Sheets

IMAGE CAPTURING UNIT AND INSPECTION SYSTEM

CROSS-REFERENCE TO RELATED APPLICATION(S)

This application is a continuation of International Patent Application No. PCT/JP2023/019347 filed on May 24, 2023, the entire disclosure of which is incorporated herein by reference.

BACKGROUND OF THE INVENTION

Technical Field

The invention relates to an image capturing unit in an inspection target appearance inspection system, and an inspection system.

Background Art

There are inspection systems that capture images of the appearance of inspection targets while causing the inspection targets to fall, and, from the captured images, determine and sort unsuitable inspection targets (refer to Japanese Patent No. 4915129).

Image capturing conditions affect determination accuracy in inspection systems.

SUMMARY OF INVENTION

Accordingly, an image capturing unit having a configuration that makes it possible to further improve determination accuracy and an inspection system using the image capturing unit is provided.

One aspect of embodiments relates to an image capturing unit in an inspection system for performing an inspection target appearance inspection, the image capturing unit comprising: an image capture unit; an illumination unit arranged in a periphery of the image capture unit; and a protective unit covering the image capture unit and the illumination unit, wherein the protective unit includes a plate-like member configured by a first planar portion and a second planar portion being connected through a bent portion bent in a dog leg shape, and the image capture unit is located on a back side of the first planar portion.

Another aspect of embodiments relates to an inspection system for performing inspection target appearance inspection, the system comprising: a first image capturing unit described above; a second image capturing unit described above; and a processing apparatus that controls operation of the first image capturing unit and the second image capturing unit, and determines an inspection target to be sorted out from among inspection targets based on images captured by the first image capturing unit and the second image capturing unit, wherein the first image capturing unit and the second image capturing unit are arranged to face each other through a region through which the inspection target passes, at an orientation in which the first planar portion of the first image capturing unit and the first planar portion of the second image capturing unit are respectively arranged on a top side.

Further features of the disclosure will become apparent from the following description of exemplary embodiments (with reference to the attached drawings).

DESCRIPTION OF THE EMBODIMENTS

Figure 1:
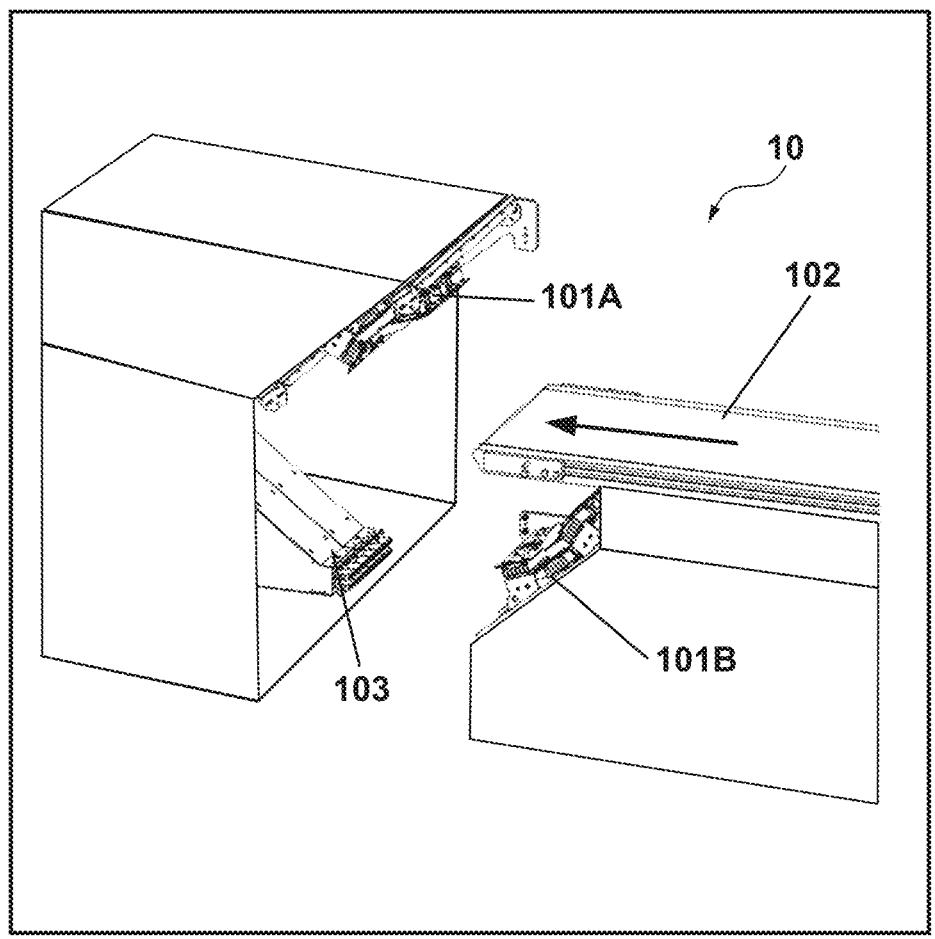
FIG. 1 is a view illustrating an example of the appearance of an inspection system 10.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First, with reference to FIG. 1, an external configuration of the inspection system 10 for performing an inspection target appearance inspection will be described. FIG. 1 is a view illustrating an example of the external configuration of the inspection system 10 corresponding to the embodiment. Referring to FIG. 1, the inspection system 10 may be configured to include image capturing units 101A and 101B, a belt conveyor 102, a discharge unit 103, or the like or the like. Inspection targets in the present embodiment include grains such as rice and barley, other grains, granules such as seeds or raw materials for processing, as well as industrial products such as tablets, screws, nuts, buttons, rubber products, and also food products such as vegetables, meats, fried or frozen foods, or the like.

In the present embodiment, in accordance with control by an external information processing apparatus (the information processing apparatus 206 illustrated in FIG. 2A), while the inspection target conveyed by the belt conveyor 102 falls between the image capturing units 101A and 101B, the image capturing units 101A and 101B capture images of the appearance of the inspection target. The captured images are provided to the information processing apparatus 206, the discharge unit 103 is caused to operate in a case where an inspection target determined to be unsuitable, such as when a shape or color does not meet a certain standard, is discovered, to discharge air and sort out the inspection target determined to be unsuitable.

Figure 2A:
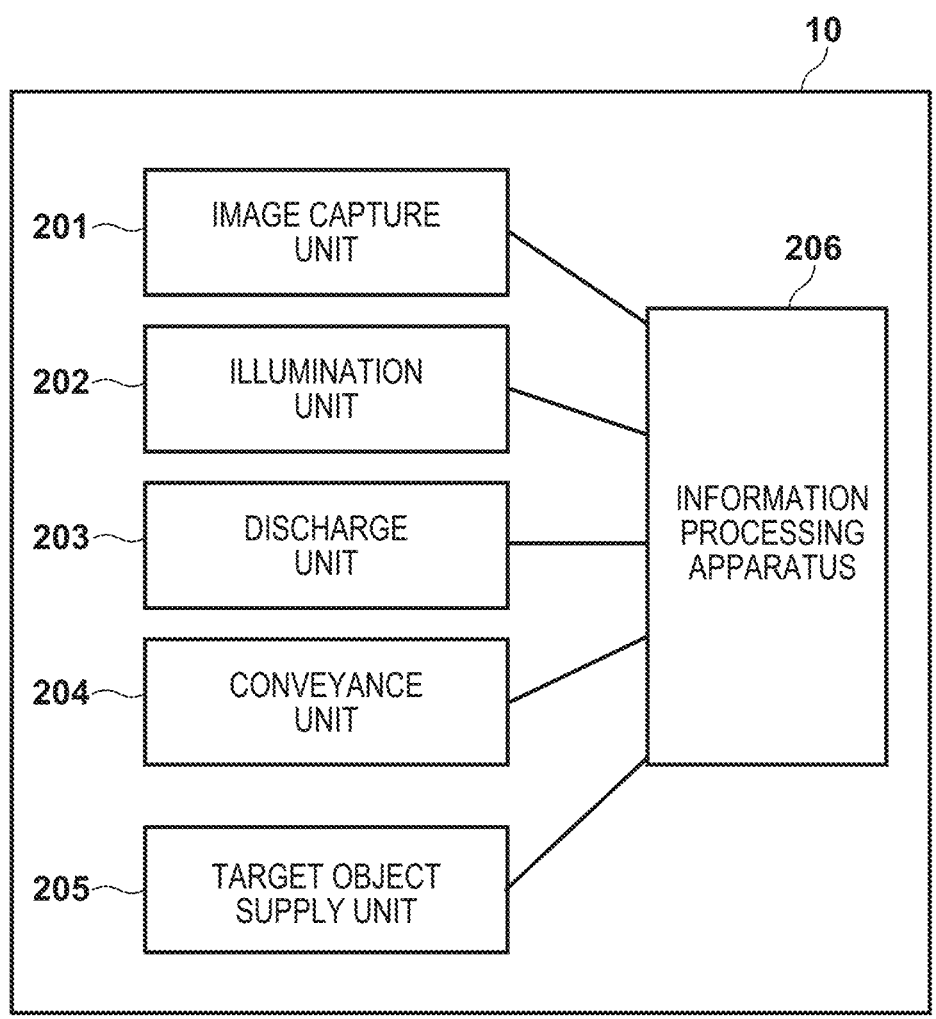
FIG. 2A is a block diagram illustrating an example of a functional configuration of the inspection system 10.

FIG. 2A is a block diagram illustrating an example of a functional configuration of the inspection system 10 corresponding to the embodiment. In the inspection system 10 as illustrated in FIG. 2A, the information processing apparatus 206 controls the operation of an image capture unit 201, an illumination unit 202, a discharge unit 203, a conveyance unit 204, and a target object supply unit 205.

The image capture unit 201 is configured to include a two-dimensional area sensor, an AD converter or the like, and it is possible to use an image capturing element such as a CCD or a CMOS therefor. By using a two-dimensional area sensor, as compared with a line sensor which has been widely used in conventional sorting apparatuses, the angle of view is wider, and also by capturing an image of the inspection target a plurality of times, it is possible to substantially increase the inspectable area.

The number of pixels of the area sensor may be several million pixels as an example, but is not limited thereto. The number of pixels depends on the size of the inspection target and the criteria to be discriminated by inspection. For example, as long as the size of external features of the inspection target for determining whether criteria are met is equal to or greater than a certain amount, VGA image quality or the like need only be ensured; on the other hand, when it is necessary to determine detailed features, it is possible to use an image capturing element that is of a high resolution such as 4K. The image capture unit 201 may include a hood arranged on a light receiving surface side of the image capturing element so that light from the outside does not enter the image capturing element.

The image capture unit 201 can perform image capturing at a frame rate of from 20 to 35 frames per second by the control of the information processing apparatus 206. The frame rates indicated here are examples and a higher frame rate is possible. In the present embodiment, the image capturing is described illustratively as being performed at 30 frames per second.

The illumination unit 202 is arranged in the periphery of the image capture unit 201 so as to surround the image capture unit 201, and includes a plurality of LEDs arranged in a matrix. As an arrangement pattern of the illumination unit 202, arrangement at the top, bottom, left, and right of the image capture unit 201 can be considered. Further, the illumination unit 202 may be arranged only on the top and bottom, and it may be arranged only on the left and right. Alternatively, the illumination unit 202 may be arranged only in whichever of the top and the bottom has better light directivity, or may be arranged only in whichever of the left and the right has better light directivity. The illumination unit 202 irradiates light onto the inspection target at the time of image capturing by the image capture unit 201.

The image capturing units 101A and 101B are configured to include a camera unit combining the image capture unit 201 and the illumination unit 202; there may be a plurality of camera units arranged in each of the image capturing units 101A and 101B.

The discharge unit 203 corresponds to the discharge unit 103 and is a mechanism for discharging air; for example, the discharge unit 203 is configured as a mechanism for blowing air by releasing compressed air by an electromagnetic valve, a flap drive mechanism, or a fan including a fan and a motor. By operating the discharge unit 203, it is possible to send out the air within the space in which the inspection target is dropped. The operation of the discharge unit 203 is controlled by the information processing apparatus 206, and when an inspection target whose image is captured by the image capture unit 201 is determined to be unsuitable, the discharge unit 203 may be operated to sort out the inspection target.

The conveyance unit 204 corresponds to the belt conveyor 102, conveys the inspection target, and supplies the inspection target into the inspection space where the image capturing units 101A and 101B perform image capturing. A mechanism for conveying an inspected target object may also be included. The target object supply unit 205 is a mechanism for discharging the inspection target from a holding portion in which the inspection target is held to supply it to the conveyance unit 204. Operation of the conveyance unit 204 and the target object supply unit 205 is controlled by the information processing apparatus 206. Operation of the conveyance unit 204 and the target object supply unit 205 may be controlled by a control apparatus other than the information processing apparatus 206. In such a case, the information processing apparatus 206 can cooperate with the control apparatus.

The information processing apparatus 206 is an apparatus for controlling operation of the image capture unit 201, the illumination unit 202, the discharge unit 203, the conveyance unit 204, and the target object supply unit 205, and, for example, is configured in a personal computer or the like. In the information processing apparatus 206, by processing images acquired from the image capture unit 201, it is determined whether an inspection target which is the target of image capturing meets certain criteria, and when it is determined that the criteria are not met, the air is sent out by controlling the discharge unit 203 to operate the fan, for example, to thereby sort out the unsuitable inspection target.

Figure 2B:
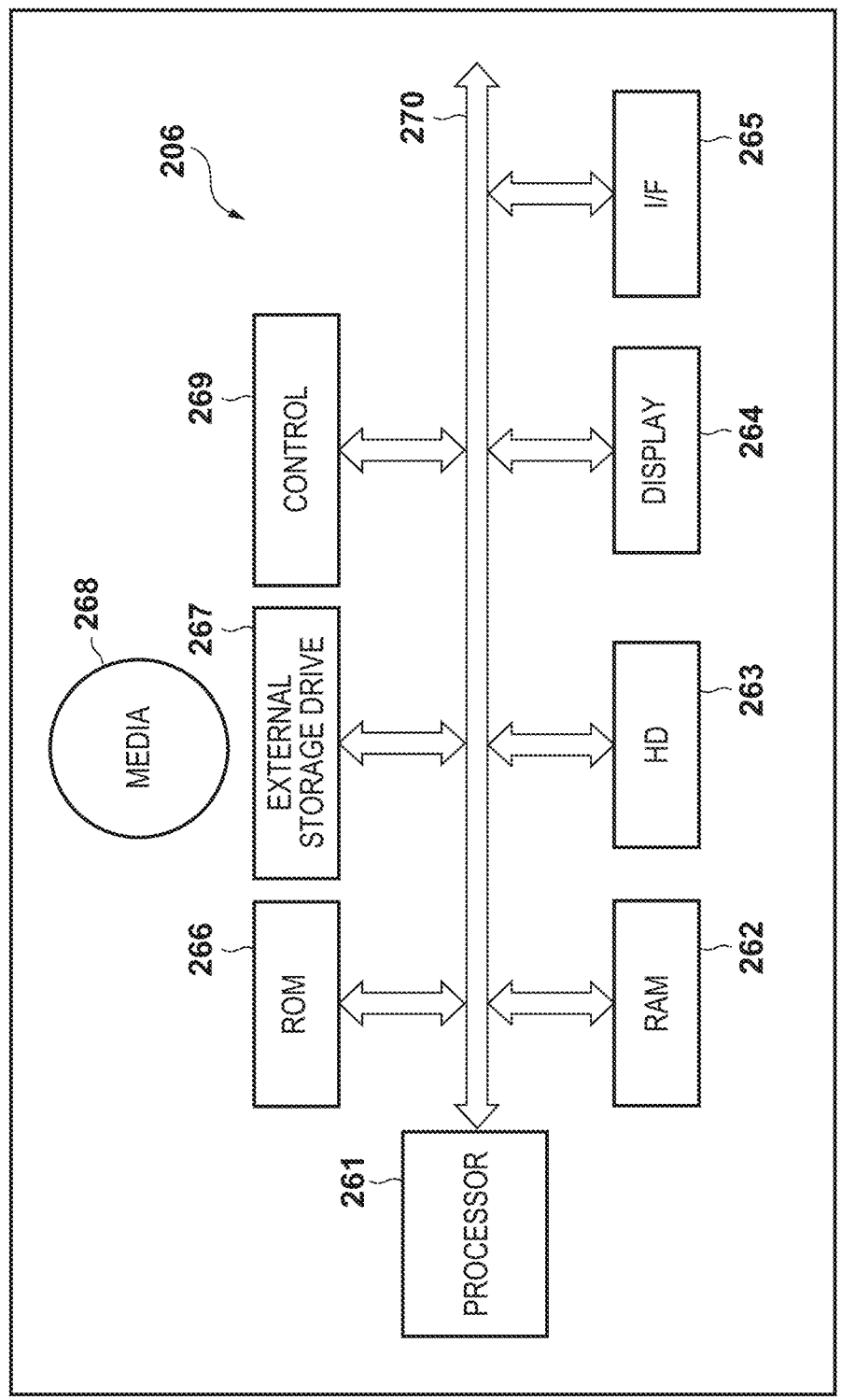
FIG. 2B is a view illustration an example of a hardware configuration of an information processing apparatus 206.

Next, with reference to FIG. 2B, an example of a hardware configuration of the information processing apparatus 206 will be described. In FIG. 2B, a processor 261 executes an OS and various application programs or the like, which are stored in a hard disk (HD) 263, the application programs being for controlling the operations of the image capture unit 201, the illumination unit 202, the discharge unit 203, the conveyance unit 204, and the target object supply unit 205, and performs control for temporarily storing in the RAM 262 information, files, or the like necessary for executing the programs. The processor 261 includes a CPU, a GPU, an FPGA, an ASIC or the like. The RAM 262 functions as a main memory, a work area, or the like of the processor 261. The HD 263 stores application programs, driver programs, an OS, control programs, and processing programs for executing processing corresponding to the present embodiment.

A display 264 is a display means for displaying a command inputted from an operation unit 269 or information or the like acquired from the outside. An interface (hereinafter, referred to as an I/F) 265 is a communication interface for connecting to an external device such as the image capturing unit 101 or a network. A ROM 266 stores programs such as a basic I/O program. An external storage drive 267 may load programs or the like stored in media 268 into a computer system. The media 268 is a recording medium and stores predetermined programs and associated data. The operation unit 269 is a user interface for allowing an operator of the apparatus to input an instruction, and is composed of a keyboard and a mouse. A system bus 270 controls the flow of data within the device.

Figure 3A:
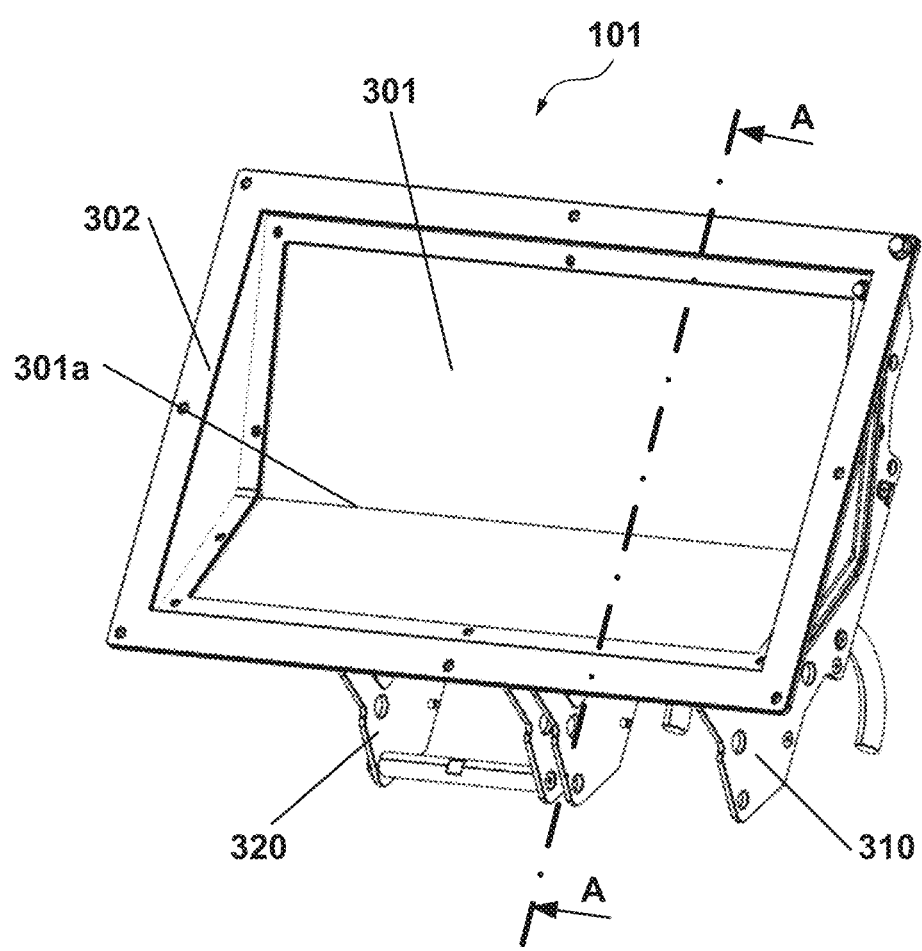
FIG. 3A is a view illustrating an example of an external configuration of an image capturing unit 101.
Figure 3B:
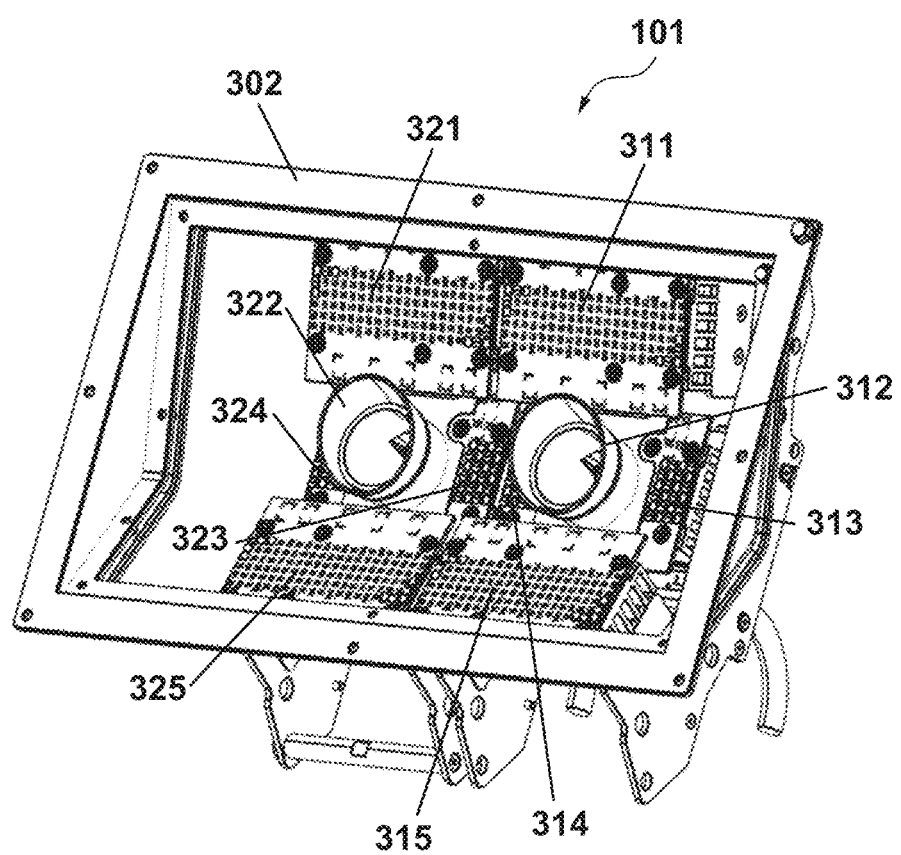
FIG. 3B is a view illustrating an example of another external configuration of the image capturing unit 101.

Referring now to FIGS. 3A and 3B, an external configuration of the image capturing units 101A and 101B (hereinafter, simply referred to as the image capturing unit 101) will be described.

FIG. 3A is a view illustrating an example of an external configuration of a windshield 301 of the image capturing unit 101 when viewed from the front side. In FIG. 3A, the windshield (cover) 301 is attached to the image capturing unit 101 so that dust or the like does not enter the camera lens. The windshield 301 is attached to a frame 302, and has a configuration where it is bent in a dog leg shape at the bent portion indicated by reference numeral 301a. The windshield 301 and the frame 302 constitute a protective unit that covers and protects the image capturing unit 101 from dust. The windshield 301 is a colorless transparent acrylic and has a configuration that does not block light from entering the image capture unit 201 or block light emitted from the illumination unit 202. Note that the windshield 301 may be made of resin such as glass or polycarbonate rather than acrylic. The frame 302 on the other hand is a structure made of, for example, metal or plastic and does not transmit light. On the back side of the windshield 301, camera units 310 and 320 which are combinations of the image capture unit 201 and the illumination unit 202 are arranged.

The camera units 310 and 320 are basically of a common structure, and the components illustrated by the reference numerals 31X and 32X in the following explanation are common components. Thus, the description with reference to 31X applies similarly to 32X. Further, the same number of camera units 310 and 320 are arranged in the image capturing units 101A and 101B, respectively; in the case of distinguishing the image capturing unit in the description, a capital letter symbol A or B will be added as a suffix. Components to which an A symbol is added are components of the image capturing unit 101A, and components to which a B symbol is added are components of the image capturing unit 101B. The difference in the symbol is only to which image capturing unit the component belongs to, and the basic configuration is the same, as indicated by 31X and 32X.

FIG. 3B illustrates a state in which the windshield 301 in FIG. 3A has been removed and illustrates an example of a configuration of the camera units 310 and 320. The LED illumination units 311, 313, 314, and 315 are arranged in the camera unit 310; the region where the image capturing element (not illustrated) is arranged is surrounded by the respective LED illumination units; and a hood 312 is arranged above the image capturing element. Incidentally, an arrangement of top, bottom, left, and right LED illumination units is given only as an example, and any combination of these may be used. The hood 312 is cut diagonally to allow contact with the windshield 301. The material of the hood 312 may be, for example, silicon, resin, metal, rubber, wood, glass, or the like. It is possible to reduce the reflection of a flare or the like by mounting the hood 312 so that it is sufficiently close to the windshield 301 in this way. Further, a lens for the internal image capturing element may be arranged inside the hood 312.

Similarly, the LED illumination units 321, 323, 324, and 325 are arranged for the camera unit 320, and a hood 322 is arranged to be surrounded by the LED illumination units. The hood 322 is cut diagonally to allow contact with the windshield 301. Further, a lens for the internal image capturing element may be arranged inside the hood 322.

A plurality of camera units 310 may be arranged laterally in FIG. 3B, and the windshield 301 and the frame 302 are configured to have a width proportional to the number of camera units 310 that can be arranged.

Figure 4A:
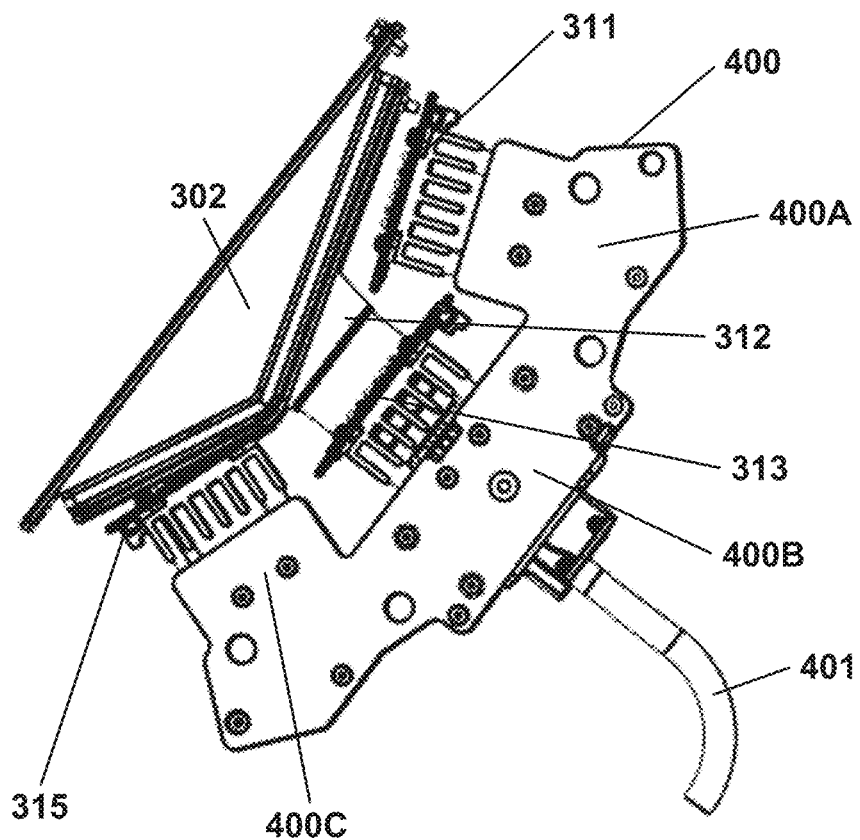
FIG. 4A is a view illustrating an example of another external configuration of the image capturing unit 101.
Figure 4B:
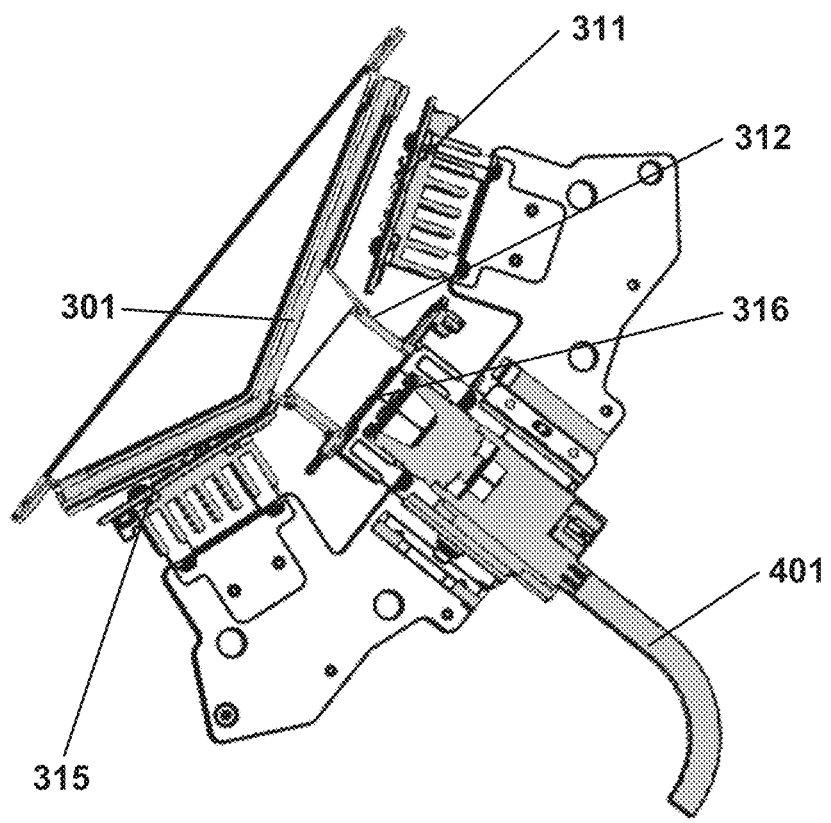
FIG. 4B is a view illustrating an example of a cross-sectional structure of the image capturing unit 101.

Referring now to FIGS. 4A and 4B, the external configuration of the image capturing unit 101 will be further described. FIG. 4A is a view illustrating an example of an external configuration of the image capturing unit 101 when viewed from the side. The configurations illustrated in FIG. 3A and FIG. 3B are also illustrated in FIG. 4A. FIG. 4A illustrates that a heatsink is attached to the back of the LED illumination units 311, 313, and 315. This is a cooling configuration for cooling the heat from each LED illumination unit. The cooling mechanism may be something that uses forced cooling by a fan or water cooling. Further, a control unit 400 which is connected to the LED illumination unit 311 and the image capturing element (not illustrated) is arranged. The control unit 400 includes mechanisms 400A, 400B, and 400C for controlling the LEDs and the mechanism 400B for controlling an image capturing element (not illustrated), and is connected to the information processing apparatus 206 by a cable 401.

FIG. 4B is a view illustrating an example of a cross-sectional structure of a position indicated by an A-A line in FIG. 3A. FIG. 4B illustrates a cross-sectional structure of the windshield 301 in addition to the arrangements described above. Further, an image capturing element 316 is illustrated on the inside of the hood 312.

Next, referring to FIG. 5, a positional relation between the image capturing units 101A and 101B will be described. In the inspection system 10, the image capturing unit 101A and the image capturing unit 101B are arranged to face each other through a region through which the inspection target passes, in the same orientation in which the image capturing element 316 is positioned more to the top side than the bent portion 301a of the windshield 301.

Figure 5:
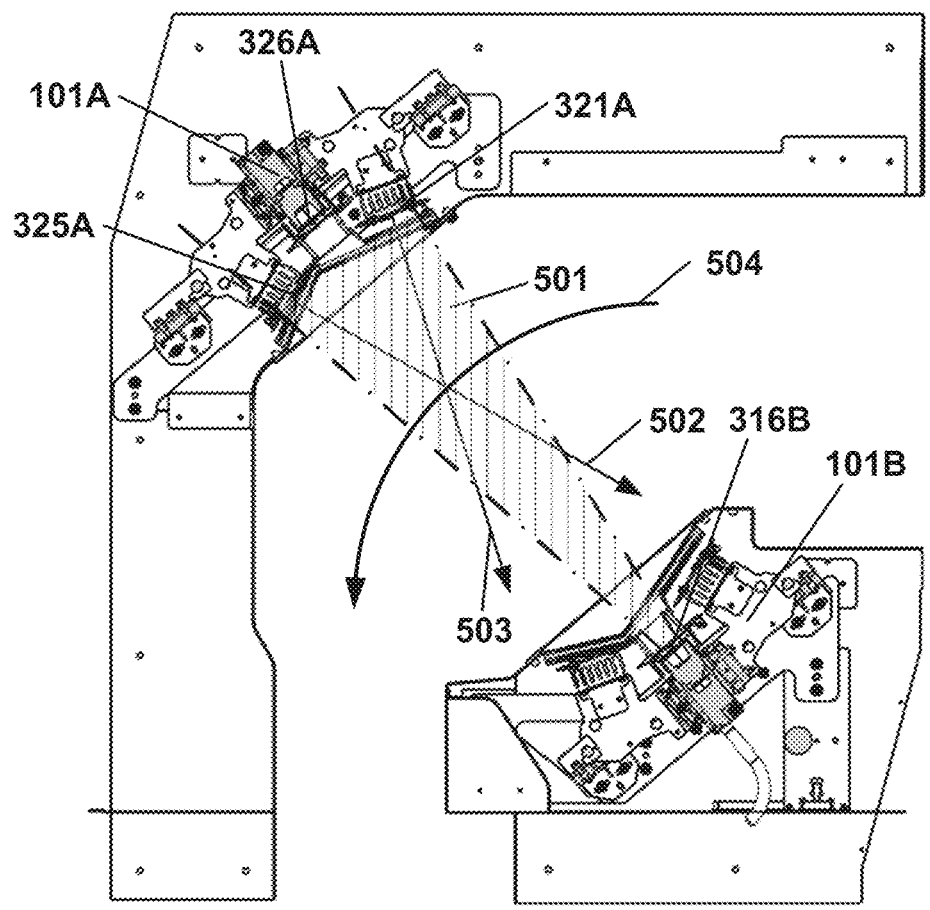
FIG. 5 is a diagram for explaining an example of an arrangement of image capturing units 101A and 101B in the inspection system.

Hatched region 501 in FIG. 5 illustrates the angle of view of the image capturing element 316B of the image capturing unit 101B. Also, arrows 502 and 503 indicate the normal direction of the installation surface of the LED illumination units 321A and 325A of the image capturing unit 101A, and indicate exemplary illumination directions. Arrow 504 indicates the direction in which the inspection target passes. Here, the light from the LED illumination units 321A and 325A has a diffuse component, but for the component that travels straight, the traveling direction of the light is parallel to the LED illumination units 321A and 325A, or perpendicular to or intersecting the plane of the windshield 301 arranged alongside the illumination units 321A and 325A. Therefore, the light from the LED illumination units 321A and 325A travels through the windshield 301. Then, the light irradiated from the LED illumination units 321A and 325A, as indicated by arrows 502 and 503, deviates from the angle of view of the image capturing element 316B illustrated by the region 501.

On the other hand, light from the LED illumination units 321A and 325A that is reflected when it strikes the inspection target is received by the image capturing element 326A, and is visualized as an image. Therefore, it is desirable that the directions of installation of the LED illumination units 321A and 325A, in other words the directions in which the light is irradiated, be defined as the directions in which the light reflected from the inspection target is supplied most to the image capturing element 326A. Further, since the intersection of the arrows 502 and 503 is set to be at a position or in a range through which the inspection target passes, the most light is irradiated onto the inspection target. Thus, it is possible to maintain the quality of the captured image because the amount of information of the inspection target can be maximized.

The positional relation between the image capturing units 101A and 101B, for example, can be decided in accordance with the size of the inspection target, the illumination angle of the LED illumination units, mechanical interference, or the like.

Further, there is a possibility that the illumination light from the LED illumination unit 321A or the like will enter the facing image capturing element 326B of the image capturing unit 101B. Accordingly, it is possible to expose the image capturing elements 326 of the image capturing units 101A and 101B at staggered timings rather than exposing them at the same timing.

Figure 6:
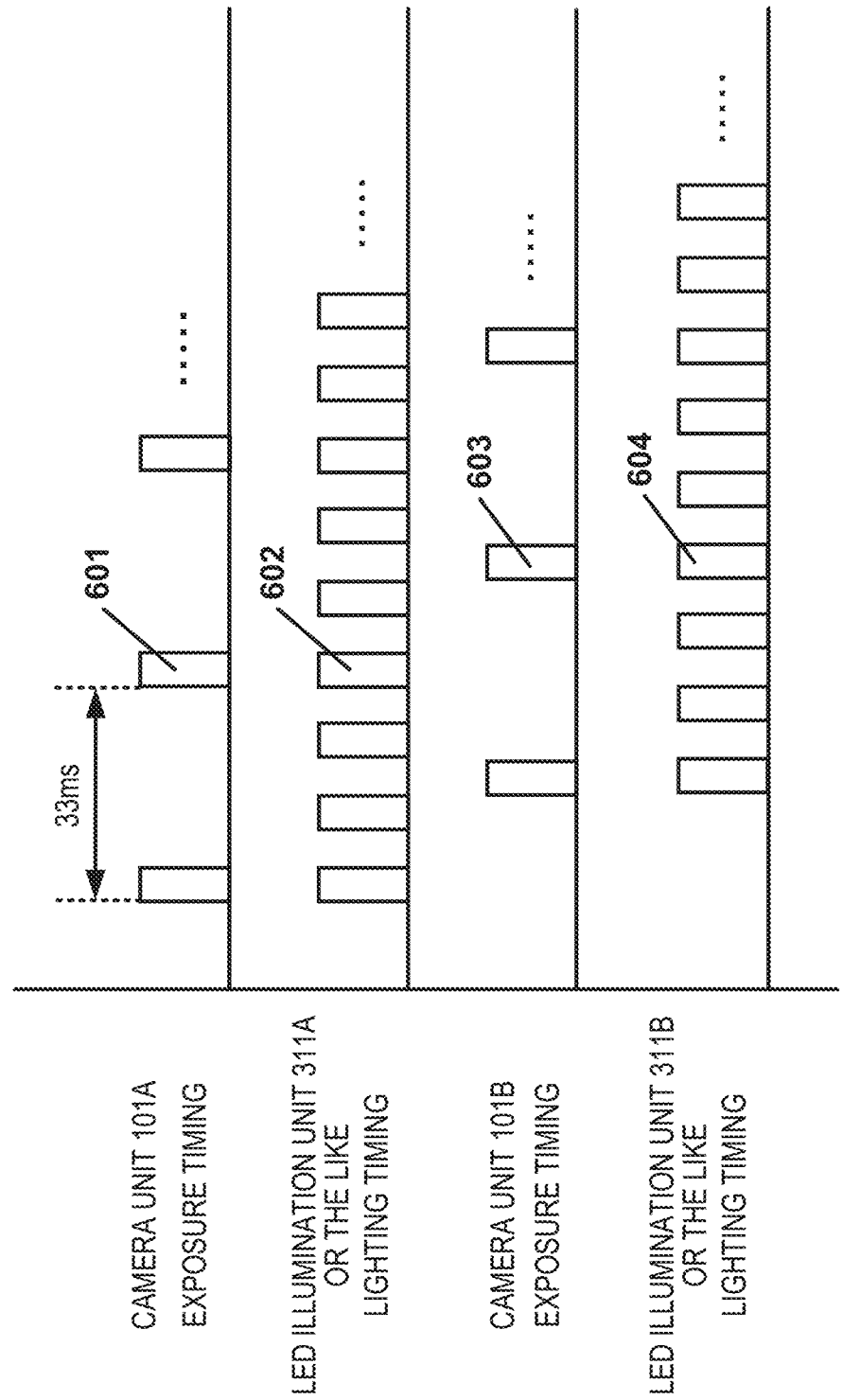
FIG. 6 is a view for describing an example of control timing of image capturing and illumination in the inspection system.

FIG. 6 is a view illustrating a relationship between the timing of the respective exposures in the image capturing units 101 and the light emission timing of the LED illumination units. In FIG. 6, the control timing of the image capturing unit 101A and the LED illumination units (311A, 313A, 314A, 315A, 321A, 323A, 324A, and 325A) of the image capturing unit 101A on the top side is illustrated. In the image capturing unit 101A, image capturing is performed using the frame rate as 30 frames per second. A pulse 601 indicates the time over which the image capturing unit 101A is exposed. The interval of the pulse 601 is approximately 33 milliseconds.

The LED illumination units of the image capturing unit 101 operate to cause the LEDs to emit light during the time of the exposure in the image capturing unit 101A. However, if the light is turned on at the same rate of 30 frames per second as the image capturing unit 101A, there is a possibility that flashing will be perceived by the human eye. Accordingly, it is possible to increase the number of times of lighting per unit time, to be more than the number of image captures per unit time. For example, when the number of image captures is 30 per unit time, the number of lightings may be 60 per unit time, or may be 90 per unit time. This makes it impossible for the human eye to perceive flashing. FIG. 6 illustrates the case of 90.

In FIG. 6, the control timing of the image capturing unit 101B and the LED illumination units (311A, 313A, 314A, 315A, 321A, 323A, 324A, and 325A) of the image capturing unit 101B on the bottom side is illustrated. In the image capturing unit 101B, image capturing is performed using a frame rate of 30 frames per second. However, the position of the pulse 603 indicating the exposure timing of the image capturing unit 101B is temporally staggered from the position of the pulse 601 and is also temporally staggered from the pulse 602 of the LED illumination units for the image capturing unit 101.

Thus, in a duration in which the image capturing unit 101B performs image capturing, the LED illumination units of the image capturing unit 101A are turned off, and therefore the quality of the image captured by the image capturing unit 101B does not deteriorate due to light from the LED illumination units of the image capturing unit 101A. Similarly, in a duration in which the image capturing unit 101A performs image capturing, the LED illumination units of the image capturing unit 101B are turned off, and therefore the quality of the image captured by the image capturing unit 101A does not deteriorate due to light from the LED illumination units of the image capturing unit 101B.

Figure 7:
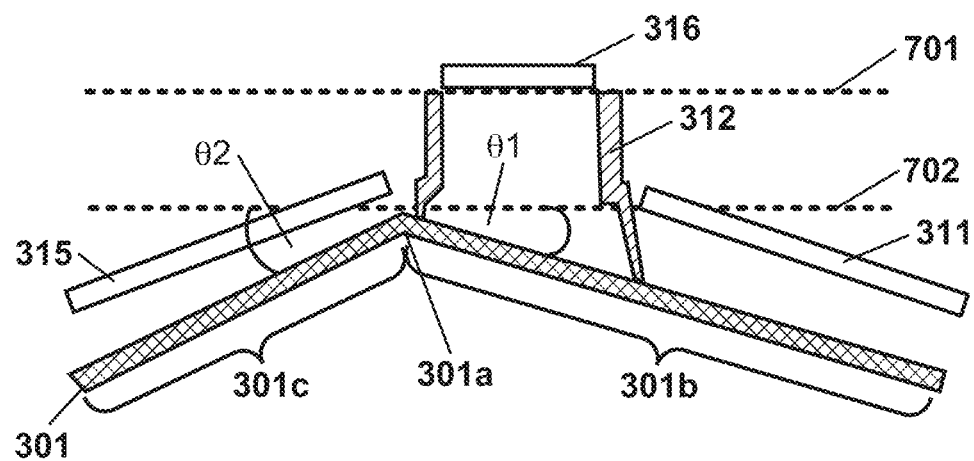
FIG. 7 is a diagram for explaining an example of the structure of a windshield 301.

Next, with reference to FIG. 7, a relationship between the light receiving plane of the windshield 301 and the image capturing element 316 will be described. FIG. 7 is a view illustrating an exemplary cross-sectional structure for explaining the installation angle of the windshield 301 with respect to the light receiving plane of the image capturing element 316.

As illustrated in FIG. 7, the windshield 301 in present embodiment is configured as a plate-like member bent in a dog leg shape. More specifically, the configuration is such that a first planar portion 301b, on the back side of which the image capturing element 316, the hood 312, and the LED illumination unit 311 are arranged, and a second planar portion 301c, on the back side of which an LED illumination unit 315 is arranged, are connected via the bent portion 301a. The LED illumination unit 311 is arranged alongside the first planar portion 301b on the back side of the first planar portion 301b, the LED illumination unit 315 is arranged alongside the second planar portion 301c on the back side of the second planar portion 301c. Although not illustrated in FIG. 7, the LED illumination units 313 and 314 are arranged on the back side of the first planar portion 301b.

In FIG. 7, the image capturing plane of the image capturing element 316 is represented by a dotted line 701. A dotted line 702 indicates a plane parallel to the image capturing plane indicated by the dotted line 701 and is set to be in contact with the bent portion 301a of the windshield 301. Letting the angle of the first planar portion 301b with respect to the dotted line 702 be θ1, and the angle of the second planar portion 301c with respect to the dotted line 702 be θ2, θ2≥θ1. Regarding the magnitudes of θ1 and θ2, for example, the lower limit of θ1 may be about 16 degrees, the lower limit of θ2 may be about 26 degrees. However, these numerical values are merely examples; angles that are larger than an angle θ min at which the reflection image from the facing image capturing unit 101 does not enter the angle of view may be selected as the values of θ1 and θ2 having calculated the reflection from the windshield 301 or the like based on at least any of the angle of view of the image capture unit 201 of the image capturing unit 101, the expected distance to the inspection target at the time of image capturing, the angle of installation, arrangement, irradiation angle, and angle with respect to the facing image capturing unit of the illumination unit 202, or the like.

Incidentally, the angle with respect to the facing image capturing unit, for example, can be obtained as an intersection angle of the normal of the image capturing plane of each image capturing unit 101. In FIG. 5, the intersection angle is 0 degrees because the image capturing elements 326A and 316B of the image capturing units 101A and 101B facing each other are facing each other directly, but the intersection angle may be non-zero. Further, by also adding a 101C to the image capturing units 101A and 101B, since a non-zero intersection angle is set in case of image capturing from three directions, it is possible to set values of θ1 and θ2 in accordance with the intersection angle.

Figure 8:
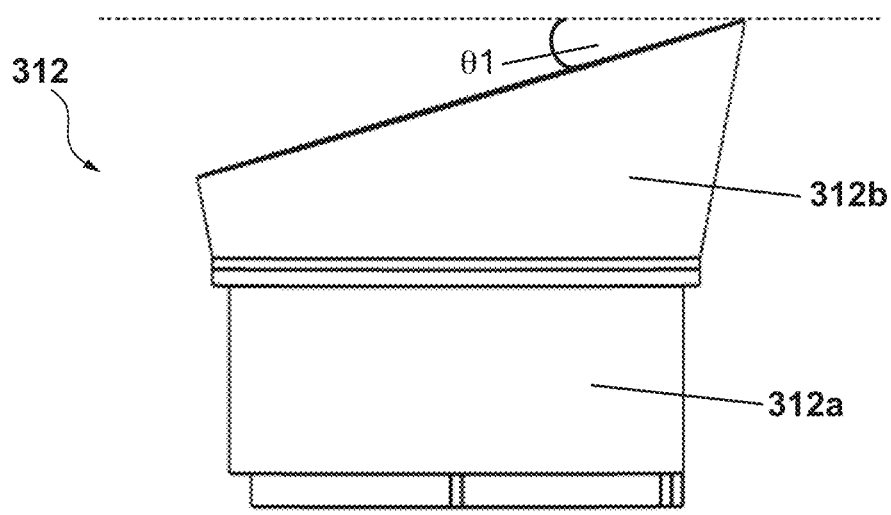
FIG. 8 is a view illustrating an example of a configuration of a hood 312.

FIG. 8 is a view illustrating an example of the external configuration of the hood 312. The hood 312 may be made of, for example, a silicon material, and is brought into close contact with the back surface of the windshield 301. The hood 312 takes a form in which a first cylindrical portion 312a of the bottom side and a second portion 312b that is inversely tapered on the top side are connected. The second portion 312b is provided from the middle of the first portion 312a in this way to prevent interference with the angle of view of the image capturing element 316—that is, in a case of an inversely tapered shape from the base, the diameter of the base is too small, and it interferes with the lens; also it impairs assembly efficiency—so it is to avoid these. If the height of the hood 312 can be made shorter, the first portion 312a may be omitted.

Further, an opening portion of the second portion 312b on the top side of the hood 312, is cut in accordance with the inclination of the windshield 301. The inclination angle of the opening surface corresponds to θ1 with respect to the horizontal plane, as illustrated in FIG. 7. Thus by providing the hood 312 at an appropriate angle to the windshield 301 and bringing it into close contact with the windshield 301, it is possible to prevent ghosting and flare due to noise other than specular reflection.

According to the present embodiment described above, by using a two-dimensional area sensor in the image capture unit in the image capturing unit in the inspection system for performing an appearance inspection of an inspection target, it is possible to widen the angle of view, and, it is possible to increase the inspectable area by capturing images a plurality of times. Further, because the positional relationship between the inspection target subject and the illumination at the image capturing timing changes when capturing images a plurality of times, since it is possible to acquire images in which the appearance of shadows and highlights differs, even the same subject can be inspected multiple times with different expressions, and it is possible to reduce the risk of overlooking the subject.

Further, by arranging a windshield that is bent in a dog leg shape in the image capturing unit, it is possible to avoid a plane being formed directly in front of the image capturing unit. Since it is possible to almost eliminate specular reflection with the configuration of the windshield, it is possible to avoid a situation in which image capturing quality is greatly reduced by the illumination at the time of image capturing being reflected by the windshield of the facing image capturing unit and appearing in the image.

Furthermore, by attaching the hood so as to be sufficiently close to the windshield, it is possible to reduce the reflection of flare or the like due to noise other than specular reflection. Further, since the hood can be brought into close contact with the windshield, it is possible to ensure the noise reduction effect more reliably.

It is possible to provide an image capturing unit having a configuration that makes it possible to further improve determination accuracy and an inspection system using the image capturing unit.

Summary of Embodiments

The above embodiments disclose at least the following image capturing unit and inspection system.

(1) An image capturing unit in an inspection system for performing an inspection target appearance inspection, the image capturing unit comprising:
an image capture unit;
an illumination unit arranged in a periphery of the image capture unit; and
a protective unit covering the image capture unit and the illumination unit, wherein
the protective unit includes a plate-like member configured by a first planar portion and a second planar portion being connected through a bent portion bent in a dog leg shape, and
the image capture unit is located on a back side of the first planar portion.

(2) The image capturing unit according to (1), wherein the first planar portion has an inclination of a first angle in relation to an image capturing plane of an image capturing element that the image capture unit has,
the second planar portion has an inclination of a second angle in relation to the image capturing plane of the image capturing element,
and the second angle is equal to or greater than the first angle.

(3) The image capturing unit according to (2), wherein the illumination unit comprising,
a first illumination unit positioned on the back side of the first planar portion and arranged alongside the first planar portion.

(4) The image capturing unit according to (2) or (3), wherein the illumination unit comprising,
a second illumination unit positioned on the back side of the second planar portion and arranged alongside the second planar portion.

(5) The image capturing unit according to any one of (2) to (4), wherein the illumination unit further comprising,
a third illumination unit positioned on the back side of the first planar portion and arranged parallel to the image capturing plane of the image capturing element.

(6) The image capturing unit according to any one of (2) to (5), wherein the image capture unit further comprises a hood for the image capturing element,
and the hood has an opening portion that contacts a back surface of the first planar portion and that is cut at an inclination corresponding to an inclination of the first planar portion.

(7) The image capturing unit according to claim 6, wherein the hood is configured by a cylindrical first portion and an inversely tapered second portion being connected,
and the second portion contacts the back surface of the first planar portion.

(8) The image capturing unit according to any one of (2) to (7), wherein the image capture unit includes a two-dimensional area sensor.

(9) The image capturing unit according to any one of claims 2 to 8, comprising a plurality of image capture units and a plurality of illumination units,
wherein the protective unit covers the plurality of image capture units and the plurality of illumination units.

(10) An inspection system for performing an inspection target appearance inspection, the system comprising:
a first image capturing unit according to any one of (2) to (9);
a second image capturing unit according to any one of (2) to (9); and
a processing apparatus that controls operation of the first image capturing unit and the second image capturing unit, and determines an inspection target to be sorted out from among inspection targets based on images captured by the first image capturing unit and the second image capturing unit, wherein
the first image capturing unit and the second image capturing unit are arranged to face each other through a region through which the inspection target passes, at an orientation in which the first planar portion of the first image capturing unit and the first planar portion of the second image capturing unit are respectively arranged on a top side.

(11) The inspection system according to claim 10, wherein for the first image capturing unit and the second image capturing unit,
the first angle and the second angle are calculated based on at least any of the angle of view of the image capture unit, an expected distance to the inspection target at the time of image capturing, an angle at which the illumination unit is installed, an arrangement and irradiation angle, and angle with respect to a facing image capturing unit, and the first angle and the second angle are set to be larger than a minimum angle at which a reflection image due to the plate-like member of one image capturing unit does not enter the angle of view of the other image capturing unit.

(12) The inspection system according to (10) or (11), wherein the processing apparatus controls the first image capturing unit and the second image capturing unit so that image capturing by the first image capturing unit and the second image capturing unit is executed temporally alternating.

(13) The inspection system according to (12), wherein the processing apparatus controls each of the illumination units so that an illumination by the illumination unit of the first image capturing unit and an illumination by the illumination unit of the second image capturing unit are executed temporally alternating in correspondence with the timing of image capturing by the first image capturing unit and the second image capturing unit.

(14) The inspection system according to any one of (10) to (13), wherein the processing apparatus makes the number of times the illumination unit is caused to emit light per unit time more than the number of times the first image capturing unit and the second image capturing unit capture images per unit time.

The invention is not limited to the foregoing embodiments, and various variations/changes are possible within the spirit of the invention.

What is claimed is:

1. An image capturing unit in an inspection system for performing an inspection target appearance inspection, the image capturing unit comprising:
   an image capture unit;
   an illumination unit arranged in a periphery of the image capture unit; and
   a protective unit covering the image capture unit and the illumination unit, wherein
   the protective unit includes a plate-like member configured by a first planar portion and a second planar portion being connected through a bent portion bent in a dog leg shape, and
   the image capture unit is located on a back side of the first planar portion,
   wherein the first planar portion has an inclination of a first angle in relation to an image capturing plane of an image capturing element that the image capture unit has,
   the second planar portion has an inclination of a second angle in relation to the image capturing plane of the image capturing element, and
   the second angle is equal to or greater than the first angle.

2. The image capturing unit according to claim 1, wherein the illumination unit comprising,
   a first illumination unit positioned on the back side of the first planar portion and arranged alongside the first planar portion.

3. The image capturing unit according to claim 1, wherein the illumination unit comprising,
   a second illumination unit positioned on the back side of the second planar portion and arranged alongside the second planar portion.

4. The image capturing unit according to claim 1, wherein the illumination unit further comprising,
   a third illumination unit positioned on the back side of the first planar portion and arranged parallel to the image capturing plane of the image capturing element.

5. The image capturing unit according to claim 1, wherein the image capture unit further comprises a hood for the image capturing element, and the hood has an opening portion that contacts a back surface of the first planar portion and that is cut at an inclination corresponding to an inclination of the first planar portion.

6. The image capturing unit according to claim 5, wherein the hood is configured by a cylindrical first portion and an inversely tapered second portion being connected, and the second portion contacts the back surface of the first planar portion.

7. The image capturing unit according to claim 1, wherein the image capture unit includes a two-dimensional area sensor.

8. The image capturing unit according to claim 1, comprising
   a plurality of image capture units and a plurality of illumination units, wherein
   the protective unit covers the plurality of image capture units and the plurality of illumination units.

9. An inspection system for performing an inspection target appearance inspection, the system comprising:
   a first image capturing unit and a second image capturing unit according to claim 1; and
   a processing apparatus that controls operation of the first image capturing unit and the second image capturing unit, and determines an inspection target to be sorted out from among inspection targets based on images captured by the first image capturing unit and the second image capturing unit, wherein
   the first image capturing unit and the second image capturing unit are arranged to face each other through a region through which the inspection target passes, at an orientation in which the first planar portion of the first image capturing unit and the first planar portion of the second image capturing unit are respectively arranged on a top side.

10. The inspection system according to claim 9, wherein for the first image capturing unit and the second image capturing unit,
    the first angle and the second angle are calculated based on at least any of the angle of view of the image capture unit, an expected distance to the inspection target at the time of image capturing, an angle at which the illumination unit is installed, an arrangement and irradiation angle, and angle with respect to a facing image capturing unit, and the angles are set to be larger than a minimum angle at which a reflection image due to the plate-like member of one image capturing unit does not enter the angle of view of the other image capturing unit.

11. The inspection system according to claim 9, wherein the processing apparatus controls the first image capturing unit and the second image capturing unit so that image capturing by the first image capturing unit and the second image capturing unit is executed temporally alternating.

12. The inspection system according to claim 11, wherein the processing apparatus controls each of the illumination units so that an illumination by the illumination unit of the first image capturing unit and an illumination by the illumination unit of the second image capturing unit are executed temporally alternating in correspondence with the timing of image capturing by the first image capturing unit and the second image capturing unit.

13. The inspection system according to claim 9, wherein the processing apparatus makes the number of times each of the illumination units is caused to emit light per unit time more than the number of times the first image capturing unit and the second image capturing unit capture images per unit time.

* * * * *